United States Patent [19]

Casperson et al.

[11] 4,447,401

[45] May 8, 1984

[54] CARBON BLACK REACTOR WITH ANGLED COMBUSTION CHAMBER AND NON-ALIGNED TANGENTIAL HOT GAS ENTRIES FOR PRODUCTION OF NEGATIVE TINT RESIDUAL CARBON BLACK

[75] Inventors: John R. Casperson; Paul D. Hann, both of Bartlesville, Okla.

[73] Assignee: Phillips Petroleum Company, Bartlesville, Okla.

[21] Appl. No.: 350,850

[22] Filed: Feb. 22, 1982

[51] Int. Cl.³ .................. B01J 10/00; B01J 19/26; C09C 1/48
[52] U.S. Cl. .................... 422/151; 422/150; 422/156; 423/450; 423/456
[58] Field of Search ............... 422/150–157; 423/450, 456

[56] References Cited

U.S. PATENT DOCUMENTS

| 2,768,067 | 10/1956 | Heller | 422/150 X |
|---|---|---|---|
| 2,961,300 | 11/1960 | Dollinger | |
| 3,071,443 | 1/1963 | Bellew | 422/151 X |
| 3,079,236 | 2/1963 | Heller et al. | |
| 3,897,217 | 7/1975 | Cheng | 422/156 |
| 3,915,653 | 10/1975 | Cheng | 422/156 |
| 3,989,803 | 11/1976 | Henderson | 423/450 |
| 4,051,135 | 9/1977 | Vanderveen | 423/450 |
| 4,071,496 | 1/1978 | Kraus et al. | 423/450 |
| 4,213,939 | 7/1980 | Ruble | 423/450 |
| 4,294,814 | 10/1981 | Cheng | 422/150 X |
| 4,299,797 | 11/1981 | Cheng | 422/156 X |

OTHER PUBLICATIONS

McDonald et al.; Rubber Chem. & Tech. (50) 1977, pp. 842–862.
Stacy et al; (48) Rubber Chem. & Tech. (1975) pp. 538–549.
Applied Optics (50) pp. 2977–2985, Sep. 1980.

*Primary Examiner*—Michael S. Marcus

[57] ABSTRACT

A carbon black reactor to produce non-uniform gas flow patterns utilizes
(a) a precombustion chamber skewed at an angle of 30–60 degrees from the reactor axis with
  (1) offset tangential hot gas entries,
  (2) axial or offset multiple oil feed entries,
(b) an optional venturi which can be offset from the reactor axis and/or asymmetric in form.

21 Claims, 9 Drawing Figures

CARBON BLACK REACTOR WITH ANGLED COMBUSTION CHAMBER AND NON-ALIGNED TANGENTIAL HOT GAS ENTRIES FOR PRODUCTION OF NEGATIVE TINT RESIDUAL CARBON BLACK

BACKGROUND OF THE INVENTION

This invention relates to apparatus and processes for carbon black production, and especially to systems for producing carbon black of negative tint residual.

Carbon black reactors and methods of producing carbon black are well known in the prior art. Most modern carbon black reactors comprise a longitudinally extending reactor tunnel of refractory material of generally circular cross-sectional configuration defining combustion or precombustion zones, reaction zones and quench zones in contiguous axial alignment. A hydrocarbon fluid fuel, usually natural gas or fuel oil, is burned in the combustion zone tunnels with a stream of process air furnished by a blower, usually using excess air over stoichiometric requirements. The hot gases produced by the combustion of the fuel are directed, usually tangentially, into the precombustion zone and are admixed with injected carbon black feedstock, usually a heavy aromatic oil, which is usually injected as a spray of fine droplets. As the oil enters the flowing hot gases, it undergoes a series of reactions to produce the product carbon black, partially in the precombustion zone and partially in the reaction zone. The admixture of produced carbon black and hot gases (called smoke) is quenched, usually by water spray and/or by cooled reaction effluent, in the quench zone to a temperature below that at which further carbon black formation occurs. The produced carbon black is finally separated from the gases and is recovered as the carbon black product.

The physical and chemical changes that occur in the formation of carbon black from the feedstock oil are very complex. Heat is transferred rapidly to the oil droplets and vapor from the hot combustion gases, hot refractory, and combustion of a portion of the oil by oxygen which is added with the excess air used to combust the fuel. Under these conditions, feedstock oil molecules are dehydrogenated, forming carbon nuclei. The nuclei grow in size to form particles or nodules which aggregate into cluster-like agglomerates, the degree of aggregation being commonly referred to as "structure". These two properties, "structure" and particle or nodule size, are of paramount importance in the production of carbon black since they determine to a large extent the properties of manufactured articles containing carbon black. Other properties include pitting due to aftertreatment and surface chemistry.

The particle size and "structure" of produced carbon black may be measured by a variety of tests. Particle size is normally determined by measuring the surface area of the produced carbon black particles. Surface area may be determined directly or indirectly. The "tint" test, an indirect determination, measures the ability of a produced carbon black to cover the surface of a finely divided zinc pigment as compared with a standard carbon black. Adsorptive tests are used to directly measure the surface area of produced carbon black. Included among these adsorptive tests are the nitrogen adsorption ($N_2SA$) test, the iodine test, and the cetyltrimethyl ammonium bromide (CTAB) test. The CTAB molecules are too large to enter pores in the carbon black particles that may be entered by smaller nitrogen molecules. The difference between the $N_2SA$ test results and the CTAB test results is a measure of the porosity or pitting of the carbon black nodules which is another important carbon black property.

"Structure" is measured by the amount of dibutyl phthalate (DBP) absorbed by a given sample of produced carbon black. The sample of carbon black may be tested for DBP absorption both before and after being subjected to an exact crushing pressure, since the "structure" of produced carbon black drops to a lower constant value upon mechanical working. Structure as measured after such compression is a better measure of the structure of the black, such as would be encountered by mixing carbon black with other raw materials to produce manufactured articles. The test is known as the DBP test when it is performed without crushing the carbon black. When the carbon black is crushed before absorption, the test is known as the "24M4 DBP" test, or compressed DBP test, since the sample is subjected to 24,000 pounds per square inch gage of pressure four times before the dibutyl phthalate is added.

It has been disclosed in U.S. Pat. No. 4,071,496 issued Jan. 31, 1978, assigned to Phillips Petroleum Company, that the incorporation of a carbon black with a negative tint residual, preferably below minus 6, into a rubber composition causes the hysteresis property, or heat buildup, of such a rubber composition to be significantly lower than that of a rubber composition incorporating a carbon black with a higher tint residual, while the abrasion resistance of such rubber compositions incorporating these different carbon blacks remains essentially the same. Great importance has, therefore, been placed upon the discovery of methods and apparatus that are capable of producing carbon black having negative tint residual. For example, it has been found that carbon black of negative tint residual in a range below $-6$ is very desirable in the production of rubber compositions used in automobile tires because such tires exhibit low heat buildup under road conditions while retaining high abrasion resistance. The production of negative tint residual carbon black has, therefore, become increasingly important.

Tint residual is the difference between the measured tint and the tint calculated from the structure (24M4 DBP), nitrogen surface area ($N_2SA$) and CTAB surface area in accordance with a specific formula.

$$TR = T - [56.0 + 1.057(CTAB) - 0.002745(CTAB)^2 - 0.2596(24M4\ DBP) - 0.201(N_2SA - CTAB)]$$

In this formula the abbreviations used have the following meanings and the properties are measured as described:

TR: This is the tint residual.

24M4 DBP: This is a measure of structure of the carbon black in cubic centimeters per 100 grams and is measured in accordance with ASTM 3493. This property is also referred to as compressed DBP.

CTAB: This is the surface area of the carbon black measured in accordance with ASTM D3765-79, square meters per gram.

$N_2SA$: This is the surface area of the carbon black in square meters per gram, and is measured using nitrogen in accordance with ASTM D 3037.

T: This is the tint or tinting strength of the carbon black relative to the industrial reference black IRB No.

3, which has the tint value of 100. Tint is measured in accordance with ASTM 3265. The surface area, described above as CTAB and $N_2SA$, is an inverse measurement of the nodule size of the carbon black. The structure of the carbon black, expressed above as 24M4 DBP, is a measure of the complexity of the individual carbon black aggregates or of the number of nodules "fused" together in one carbon black aggregate.

Among the carbon blacks defined by the formula given above, those that are further characterized by having surface area and structure properties within the following ranges are particularly preferred:

CTAB: 73 to 140 square meters/gram
24M4 DBP: 67 to 111 cc/100 g
($N_2SA$ − CTAB): 23 square meters/gram or less All these properties, namely Tint, CTAB, 24M4 DBP and $N_2SA$, are defined and measured by ASTM procedures, as disclosed above.

Additional information relating tint residual to aggregate size distribution and nodule size distribution is detailed by Stacy, et al in "Effect of Carbon Black Structure Aggregate Size Distribution on Properties of Reinforced Rubber," *Rubber Chemistry and Technology,* Volume 48, No. 4, September–October, 1975, pages 538 through 547.

SUMMARY OF THE INVENTION

Carbon black can be produced in accordance with this invention by providing reaction conditions under which flow pattern or the amount of flow of reactants is sufficiently non-uniform during production to produce carbon black nodules having a broad spectrum of surface areas and affecting the aggregation of carbon black nodules so that aggregates having a broad spectrum of structures result. The present invention provides apparatus and methods for producing such non-uniform reactant flows as will effect production of negative tint residual carbon black.

It is, therefore, an object of this invention to provide a novel carbon black reactor which can be used for producing negative tint residual carbon black. It is still another object of this invention to provide a method for producing negative tint residual carbon black.

Other aspects, objects and the various advantages of this invention will become apparent upon a study of this specification, the drawing and the appended claims.

According to one aspect of this invention apparatus is provided for producing carbon black of negative tint residual, comprising a cylindrical combustion or precombustion chamber having an upstream and a downstream confining wall being essentially parallel to each other, and provided with feedstock injection means and means for introducing combustion gases and means for defining a flow path for these reactants; a reaction section downstream of and in open communication with said precombustion section; quenching means; and preferably, a venturi section in or downstream of said reaction zone. Said apparatus includes at least one of the following means for effecting a nonuniform mixing of feedstock oil with the hot gases from the precombustion zone, which results in the production of carbon black of negative tint residual.

In a preferred embodiment, the combustion or precombustion chamber is skewed or obliquely offset from the longitudinal axis of the reactor, preferably at an angle of 30 to 60 degrees from said longitudinal axis, that is, the upstream and downstream confining walls of said precombustion chamber describe such an angle relative to said longitudinal axis. The cylindrical wall of said chamber is preferably a circular cylinder. Means are provided for introducing air and fuel, or the resulting hot combustion gases, tangentially through at least one tangential tunnel which enters said precombustion section, thus defining a direction of hot gas injection which is essentially parallel to said upstream and downstream confining walls. In an embodiment, said direction of gas injection can also be perpendicular to said longitudinal axis.

In another embodiment, the upstream and downstream confining walls are essentially perpendicular to said longitudinal axis. In this embodiment, it is presently preferred to use two of said tangential tunnels, with their inlets to the precombustion section entering said chamber in approximately opposite directions at opposite sides of the cylindrical wall of said section, and offset from each other by a distance along the longitudinal axis of at least the diameter of said tangential tunnels.

In a further embodiment, the features of the aforementioned embodiments can be combined, with the resulting precombustion chamber having upstream and downstream confining walls substantially parallel to each other and skewed with respect to the longitudinal axis at an angle of 30 to 60 degrees, and having two tangential tunnels for introducing combustion gases through said cylindrical wall into said chamber, with the first tunnel being closer to the upstream wall than the second tunnel.

For all these and other embodiments, the following additional features can be incorporated. Said feedstock injection means for introducing reactants can include conduit means for introducing feedstock oil which are coincident with and/or offset from the axis of the reactor, and further comprise conduit means for introducing air, axially and exteriorly to said oil conduit means. Furthermore, a venturi-shaped choke in or downstream of the reaction zone can be provided, which preferably can be distorted or asymmetric about the center axis so as to affect the mixing of the feedstock oil with hot gases from the reaction zone, e.g., causing said mixing to be more nonuniform. Each embodiment has a pyrolytic carbon black-forming section operatively connected with said precombustion chamber, and in open axial communication with said precombustion chamber through said downstream confining wall. Means for quenching the carbon black are preferably provided, downstream of the reaction zone, for all embodiments.

In an embodiment of the invention, reactants are introduced under carbon black production conditions into a reactor as described above, and the resultant flow of reactants is sufficiently nonuniform or discontinuous that carbon black is produced of a relatively broad nodule size and aggregate size distribution, and thus a negative tint residual. Therefore, this invention provides apparatus and processes to produce negative tint residual (low hysteresis in rubber) carbon black as discussed in U.S. Pat. No. 4,071,496.

Standard carbon blacks produced in conventional equipment have tint residuals of about −3 to about +8, indicating uniform nodule sizes and uniform sizes of structured aggregates.

Negative tint residual carbon blacks, having tint residuals from about −6 to about −20, have broader spectra of nodule sizes and of structured aggregates. These broader spectra contribute to the lowered hysteresis effect in rubber, for example, less heat buildup as in tires with less chance of blowouts.

Uniform mixing of the feedstock and hot combustion gases tends to produce uniform nodule sizes and uniform structured aggregate sizes. Such uniform mixing occurs in conventional carbon black producing apparatus and processes. Such uniform mixing produces carbon black in about the same reaction time span or contact time between the feedstock and hot combustion gases.

In our invention, we produce carbon blacks of non-uniform nodule sizes and non-uniform structured aggregate sizes (broad spectrum or range in sizes of nodules and aggregates), but which carbon blacks meet the specifications for certain grades of carbon blacks, e.g. ASTM N220, N330, and the like.

To produce our non-uniform properties (broad range in nodule sizes and broad range in structured aggregate sizes) we effect non-uniform mixing or contact of the feedstock with the hot combustion gases, resulting in the production of a carbon black which imparts low hysteresis properties to rubber into which it has been compounded.

In our invention, part of the feedstock is producing carbon black earlier in the carbon black forming zone than another part of the feedstock. This difference in residence times of the feedstock and hot combustion gases effects production of carbon black units of different nodule sizes and different structured aggregate sizes, resulting in a negative tint residual carbon black product.

BRIEF DESCRIPTION OF THE DRAWINGS

The invention can best be understood in conjunction with the drawing, in which the figures are as follows.

DETAILED DESCRIPTION OF THE INVENTION

The invention will be still more fully understood from the description as well as the specific example.

Figure 1:
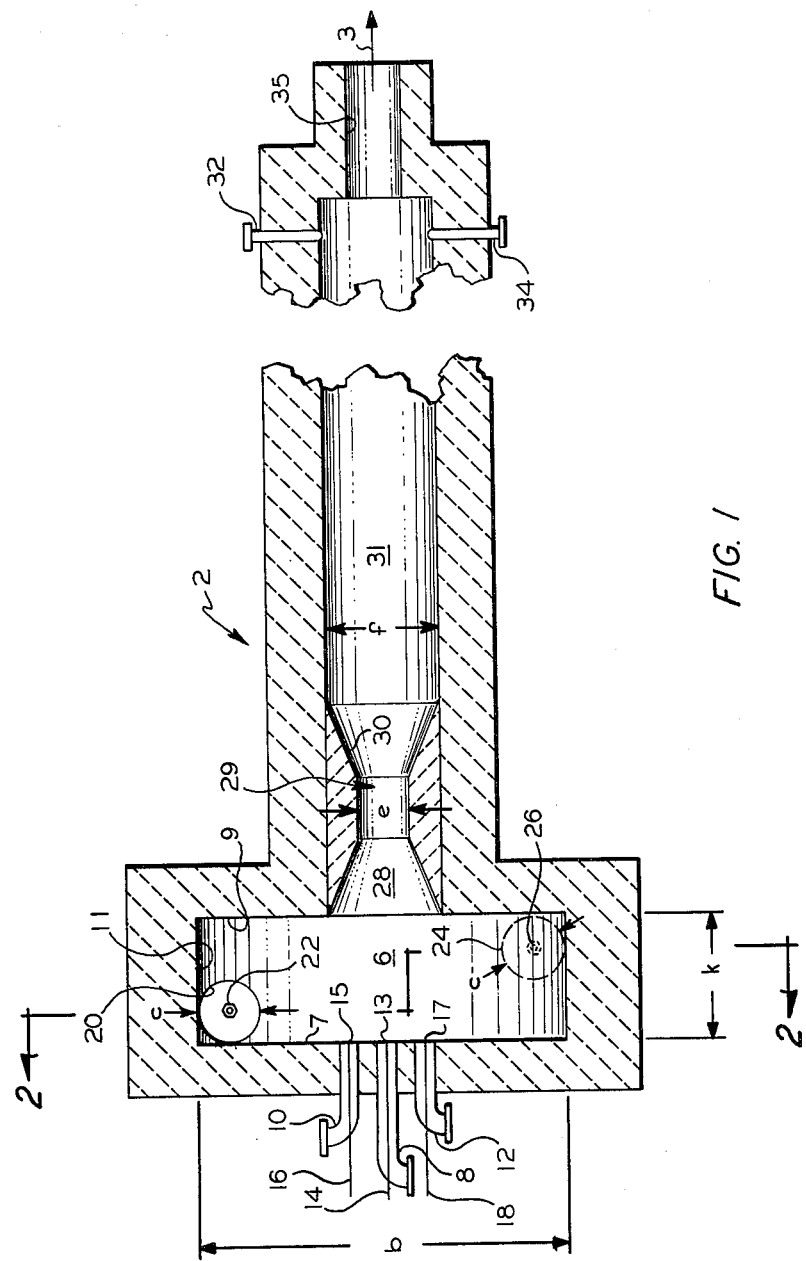
FIG. 1 is a schematic sectional view of the overall structure of one preferred embodiment of the present invention, disclosing means for providing non-uniform mixing or contact time of feedstock and hot gases, comprising tangential fuel and air inlets or tunnels entering offset into the precombustion zone, axial air and feedstock inlets, and an optional venturi-shaped choke adjacent to the precombustion chamber or zone.
Figure 2:
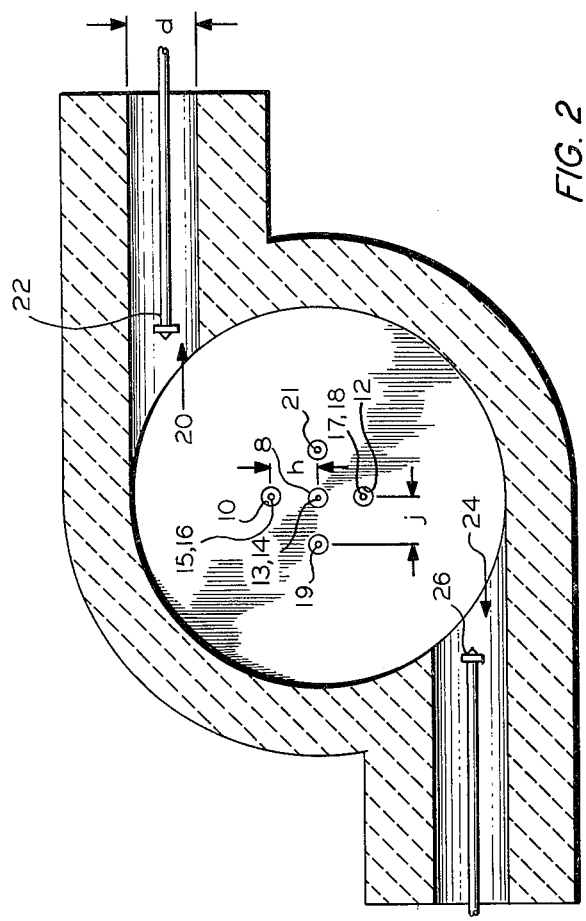
FIG. 2 is a schematic sectional view of a portion of a preferred embodiment showing tangential air and fuel entries and offset oil feed nozzles with axial air for cooling the oil nozzle means.

In the drawing, two reactors are shown in cross-section. FIGS. 1 and 2 show a tubular carbon black reactor confined by a shell 2 of heat resistant material such as ceramic. The internal shape of the reactor is essentially rotationally symmetric around the reactor longitudinal axis 3.

The reactor is composed of a precombustion chamber 6, a second reactor section 28, a venturi throat section 29, and diverging section 30, and a third reactor section 31. All these sections are in open communication, axially aligned and operatively connected with each other, preferably in series. The second reaction section 28 is essentially a frustoconically shaped section converging in a downstream direction. The precombustion chamber 6 is preferably a circular cylindrical section defined by an upstream confining wall 7, a downstream confining wall 9 and a cylindrical wall 11 which connects the walls 7 and 9.

Normally liquid hydrocarbon feedstocks can be introduced at a plurality of entries such as feedstock tube conduits 14, 16 and 18, which are equipped with discharge nozzles 13, 15 and 17, respectively, said nozzles being arranged essentially flush with the upstream wall 7 of the precombustion chamber 6. The feedstock conduits 14, 16 and 18, as well as nozzles 13, 15 and 17, are surrounded concentrically by pipes 8, 10 and 12 through which feed line cooling gases such as air can be introduced into the reactor. The air is used to protect the nozzles and oil feed lines from high temperatures.

Important aspects of embodiments of this invention lie in the plurality of oil feed nozzles and in the precombustion chamber 6 wherein a pair of offset vortices of hot combustion gases can be generated in precombustion section 6. Fuel gas, such as methane, natural gas, or fuel oil, is introduced into the precombustion chamber 6 from fuel discharge nozzles 22 and 26 (see Section 2—2 shown in FIG. 2). This fuel is burned with excess air which is fed by off-set tangential tunnels 20 and 24, which surround fuel discharge nozzles 22 and 26. Combustion of fuel begins in the tunnels and preferably substantially ends in the precombustion zone.

The oil feedstocks are introduced preferably axially and parallel to the reactor axis from nozzles 13, 15 and 17, and can optionally have at least two more oil nozzle entries 19 and 21 as shown parallel to the reactor axis; nozzle 13 is on the center line of the reactor, while nozzles 15, 17, 19, and 21 are variably offset from the centerline, as seen in FIG. 2, a distance of from about 25 to 75 percent of the radius of the chamber 6.

The plurality of oil feedstock sprays previously described is contacted with at least two longitudinally offset vortices of hot combustion gases and the reaction mixture is passed through the venturi sections 28, 29 and 30 and reactor section 31.

At the end of reaction section 31, the reaction mixture is contacted with a quenching fluid, e.g. water or cooled smoke, injected preferably in radial direction into reaction section 31 from lines 32 and 34. Thus quenched carbon black-containing smoke can be withdrawn from the reactor via a smoke withdrawal line 35.

Figure 3:
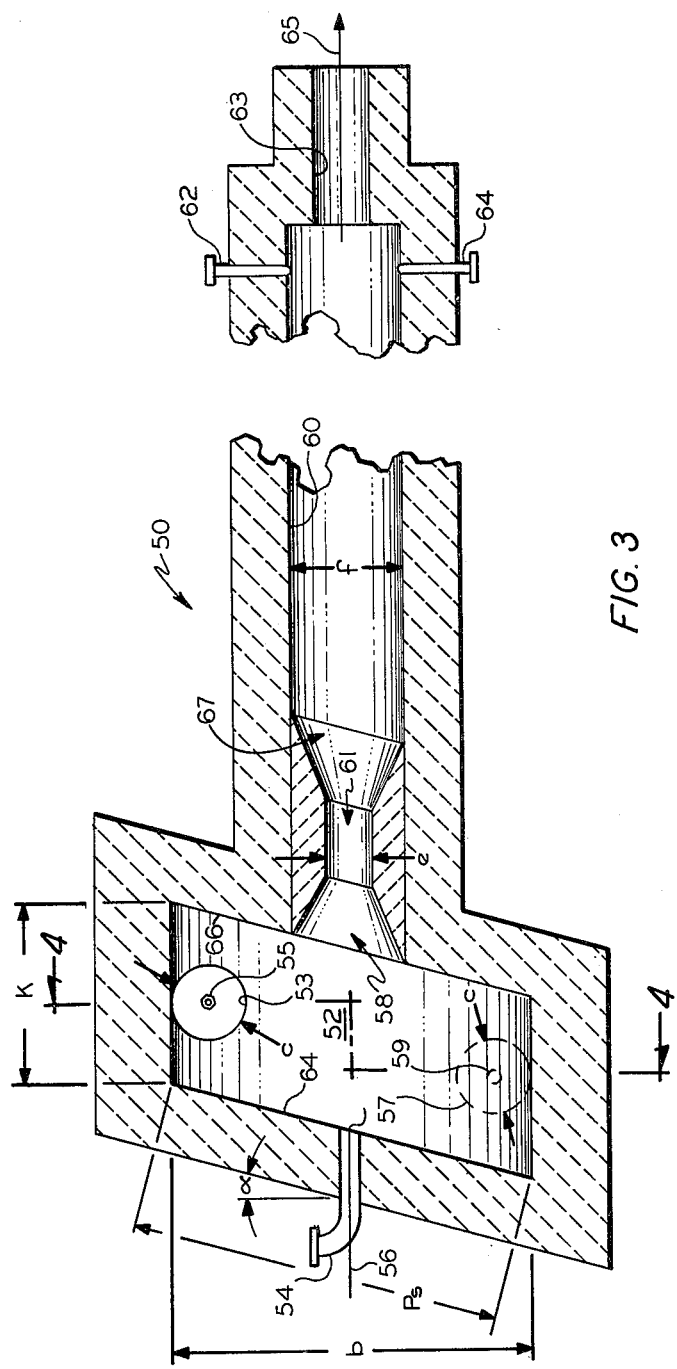
FIG. 3 is a schematic sectional view of the overall structure of another preferred embodiment of the present invention, disclosing further means for providing non-uniform mixing or contact time of feedstock and hot gases, comprising an obliquely arranged precombustion chamber or zone, a central feedstock inlet with axial nozzle cooling air, off-set tangential hot gas tunnels, and an optional asymmetric venturi-shaped choke adjacent to the precombustion chamber.
Figure 4:
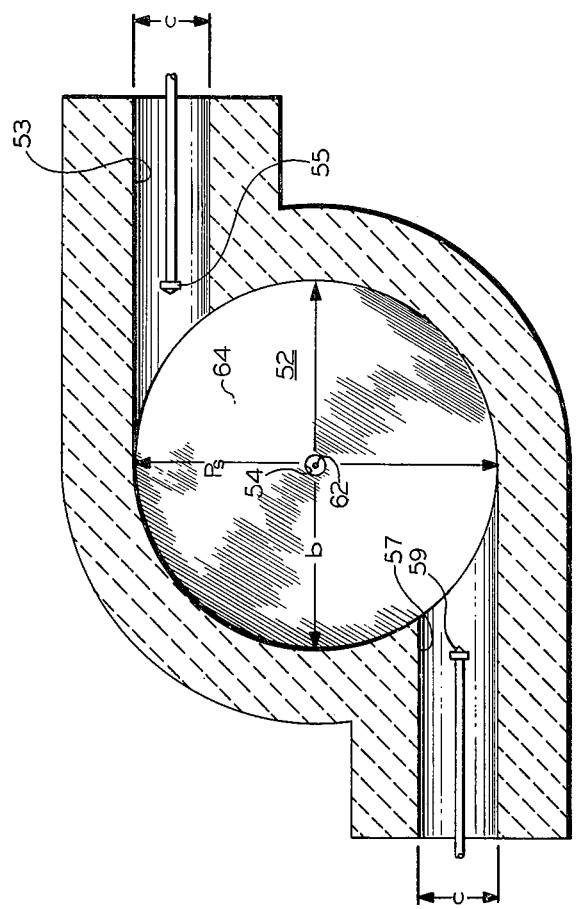
FIG. 4 is a schematic sectional view of the skewed precombustion chamber of FIG. 3, perpendicular to the longitudinal axis of the reactor.
Figure 9:
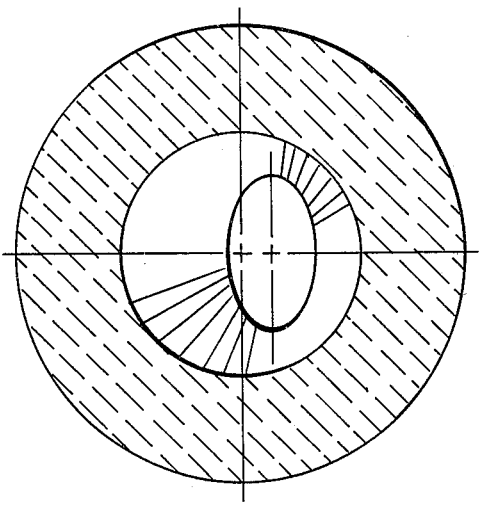
FIG. 9 is a schematic sectional view of the venturi of FIG. 8 showing a cross section of the throat and diverging section.
Figure 8:
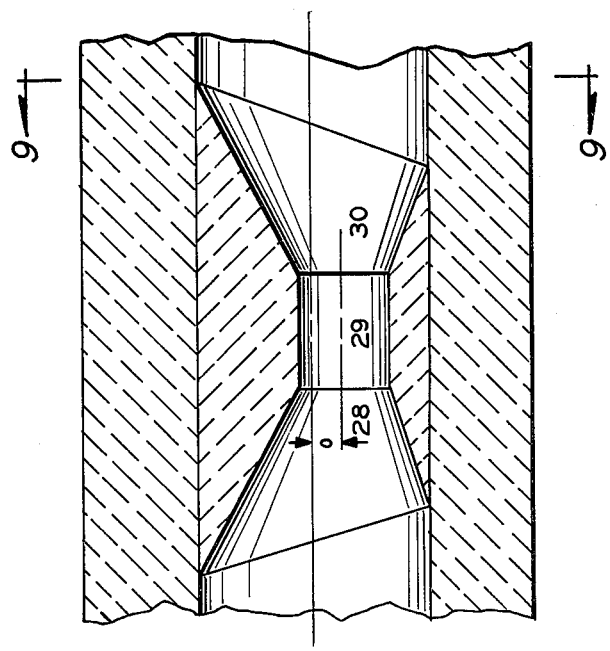
FIG. 8 is a schematic sectional view of a venturi with an offset axis and flattened throat cross-section.

Another embodiment of the invention is illustrated in FIG. 3, showing a reactor 50 similar to that shown in FIGS. 1 and 2. The cross section taken along line 4—4 of this reactor 50 is essentially the same as that of the reactor in FIG. 1 and is shown in FIG. 4. If the cross section for FIG. 4 were taken parallel to walls 64 and 66 of FIG. 3, then the wall 64 in FIG. 4 would be shown as an ellipse. Differences between the reactors shown in FIGS. 1 and 3 include precombustion chamber 52 in FIG. 3, with upstream and downstream confining walls 64 and 66, respectively, skewed or slanted with respect to the longitudinal axis at a preferred angle in the range from 30 to 60 degrees (rather than perpendicular), having hot combustion gas tunnels 53 and 57 preferably centrally spaced in precombustion chamber 52, containing fuel discharge nozzles 55 and 59, and a rotationally symmetric or optionally asymmetric venturi 58 with rotationally symmetric or optionally asymmetric venturi throat 61 and rotationally symetric or optionally asymmetric diverging section 67. The venturi and/or its throat and diverging section can be made asymmetric by, e.g., offsetting their axes from the reactor longitudinal axis, and/or flattening them so that they become elliptical or oval in cross-section. (See FIGS. 8 and 9.) The angle of slant of precombustion chamber 52 can be from 30 to 60 degrees, preferably 40 to 50 degrees, from the longitudinal axis 65 of reactor 50. That is, the upstream and downstream confining walls of precombustion chamber 52 lie in planes inclined at an angle of between 30 and 60 degrees with respect to the reactor longitudinal axis 65, and are preferably substantially parallel to each other. The hydrocarbon feedstock can enter axially toward the reactor throat 61 as shown in line 56 with oil spray nozzle 62 attached to line 56 and essentially flush with slanted interior wall 64 of combustion chamber 52. Conduit 54 forms an annulus around oil feed line 56 and through which air for cooling line 56 flows.

Reaction products pass from venturi throat 61 to section 60, at the downstream end of which they are quenched with a quenching fluid such as water or cooled smoke fed preferably radially through conduits 62 and 64. Quenched reaction products pass through line 63 to carbon black recovery equipment.

A typical reactor in accordance with this invention and in accordance with FIGS. 1, 2, 3 and 4 can have the following dimensions:

k (axial length of precombustion section 6 and 52): 12 inches.
b (diameter of precombustion chamber 6 and of minor axis of 52): 39 inches
Ps (actual major axis of ellipse of 52): 55 inches
c (diameter of tangential air channels): 8 inches
e (diameter of venturi throats): 8 inches; total inlet angle 20 degrees; total outlet 15 degrees
h;j (distance between oil nozzles or offset from axis, FIG. 2): 8 inches
f (diameter of reactor downstream of venturi): 15 inches
α (angle of slanted combustion chamber from the longitudinal axis, FIG. 3): 45°.

While angle α is shown in FIG. 3 with relation to a plane perpendicular to the reactor longitudinal axis, it can be measured equally well from said longitudinal axis, and is thus described for convenience.

In general proportions, the precombustion chamber can be larger than (up to about twice the diameter of) the carbon black forming section, with its axis coincident with said reactor axis, and of a length equal to from about 75 to 200 percent the diameter of said carbon black forming section. The venturi, when used, can have the walls of the upstream section converge at a total angle of from about 5 to about 30 degrees to a throat about half the diameter of the carbon black forming section, then the walls of the downstream section diverge at a total angle of from about 10 to about 25 degrees.

The process by which the apparatus of our invention is expected to produce carbon black of negative tint residual can be explained as follows:

Referring to FIG. 1, the axially introduced feedstock (Note that the feedstock can enter longitudinally in FIG. 3 either by an axial injection and/or one or more "off-center" axial injections) is charged into a distorted vortex of hot combustion gases which affords non-uniform mixing of the feedstock and hot combustion gases so that the carbon black nodules and aggregates are not produced in the same time span or same contact time of the feedstock and hot combustion gases.

Figure 5:
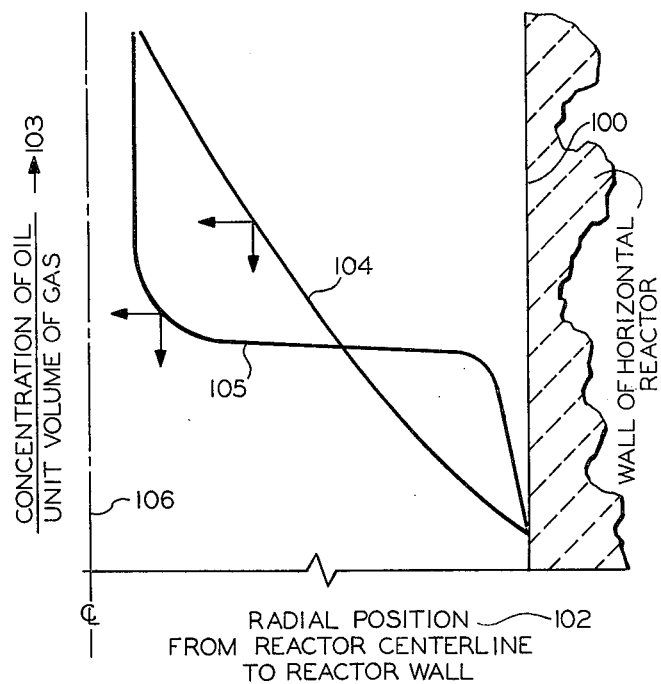
FIG. 5 illustrates certain principles of the present invention.

In FIG. 5 the left vertical axis 103 of the graph represents the concentration of oil/unit volume of gas while the horizontal axis 102 of the graph represents the radial observation position from the centerline axis 106 of the reactor and the reactor wall 100. In the example of how our invention may differ from other typical reactor features to make N220 and N330 carbon black, we show in curve 104 how our invention has a slowly changing concentration of oil/unit volume of gas compared with typical reactors producing N220 and N330 where concentration of oil per unit volume of gas is about the same over a large portion of the distance from the reactor center line to the wall as illustrated by curve 105. This means that our invention provides less rapid, non-uniform mixing and more variable residence time of portions of the feedstock oil in contact with the hot combustion gases.

Figure 6:
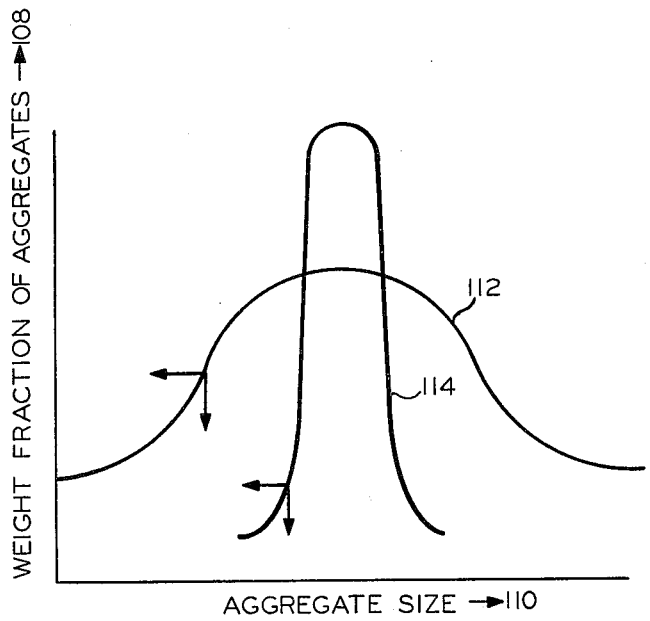
FIG. 6 illustrates certain principles of the present invention.

To further illustrate the example we refer now to FIG. 6. This is a generalized graph of the weight fraction of aggregates 108 versus the aggregate sizes 110. Our invention is illustrated by curve 112 which represents a broad spectrum or broad distribution of aggregate sizes as compared with curve 114 which represents a typical, more narrow distribution of aggregate sizes, as represented by conventional N220 and N330 blacks. As discussed above, it is known that carbon blacks of broad aggregate size distributions can also be described as having negative tint residual, the property sought to be produced by the inventive reactor embodiments.

Figure 7:
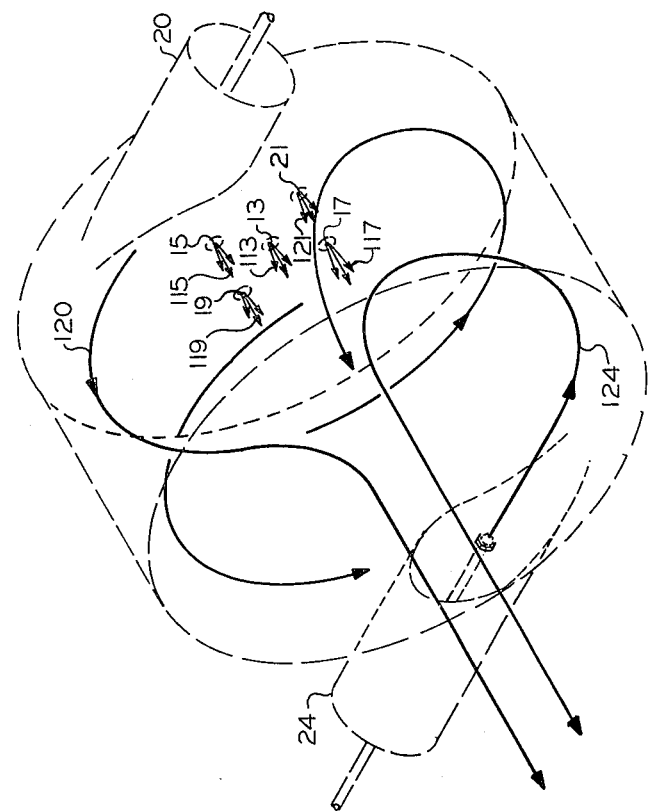
FIG. 7 illustrates streams of oil and hot gases entering the reactor of FIGS. 1 and 2, mixing and reacting in a non-uniform manner.

The process by which carbon blacks of negative tint residual and a broad nodule aggregate size distribution are produced can be seen more explicitly in FIG. 7, which shows multiple streams of oil 113, 115, 117, 119, and 121 emerging from the nozzles 13, 15, 17, 19, and 21, respectively, of FIG. 1 and 2 and contacting the two helical off-set currents of hot gases 120 and 124 at various stages in their paths as said gases emerge from offset tangential tunnels 20 and 24 respectively.

Thus, by causing said oil streams to mix with said hot gas streams and react in a markedly non-uniform manner, the inventive reactor embodiments are expected to cause the desired forms of carbon black to be produced; that is, blacks having negative tint residual values as desired.

The invention will be yet more fully understood from the following example.

CALCULATED EXAMPLE

Typical conditions are given to make negative tint residual carbon black in accordance with this invention in TABLE I, column 3. Columns 1 and 2 are typical for making N330 and N220 carbon blacks.

TABLE I

| | TYPICAL RUNS | | |
|---|---|---|---|
| | U.S. Pat. No. 3,362,970 | | FIG. 1 Typical Invention |
| | N330 (HAF) | N220 (ISAF) | Run for N330 |
| Apparatus | | | |
| Precombustion Zone: | | | |
| Length, inches | 12 | 12 | 12 |
| Diameter, inches | 39 | 39 | 39 |
| Reactor ISAF (N220): | | | |
| Diameter, inches | — | 14 | — |
| Length (to quench), inches | — | 66 | — |
| Reactor HAF (N330): | | | |
| Diameter #1, inches | 14 | — | 15 (b) |
| Length #1, inches | 66 | — | 190 (c) |
| Diameter #2, inches | 15 | — | — |
| Length #2 (to quench), inches | 124 | — | — |
| Total Length (to quench), inches | 190 | — | 190 (c) |
| Flow Rates | | | |
| Axial Air, MSCF/hr. | 4 | 4 | 4 |
| Total Tangential Air, MSCF/hr. | 250 | 250 | 250 |
| Total Fuel Oil, gal./hr. | 125 (a) | 125 (a) | |
| Total Fuel Gas (Methane), MSCF/Hr. | | | 16,700 (d) |
| Feed Oil, gal./hr. | 432 | 275 | 430 |
| BMCI | 115 | 115 | 115 |
| (Midboiling Point, ° F.) | 600 | 600 | 600 |
| Total Air to Feed Oil, SCF/gal. | 590 | 925 | 590 |
| Venturi (Optional): | | | |
| Converging Zone (total angle, °) | — | — | 34 |
| Length, inches | — | — | 11 |
| Inlet Diameter, inches | — | — | 15 |
| Throat Diameter, inches | — | — | 8 |
| Throat Length, inches | — | — | 8 |
| Diverging Zone (total angle, °) | — | — | 10 |
| Length, inches | — | — | 40 |
| Outlet Diameter, inches | — | — | 15 |

(a) Equivalent to 16,700 SCF/hr methane.
(b) Constant diameter without venturi.
(c) Quench locus
(d) Methane as fuel, 16,700 scf/hr.

Reasonable variations and modifications which will become apparent to those skilled in the art can be made from this invention without departing from the spirit and scope thereof.

We claim:

1. A carbon black reactor comprising:
   (a) a precombustion chamber defined by an upstream confining wall, a downstream confining wall substantially parallel thereto, and a cylindrical wall having a longitudinal axis wherein said cylindrical wall connects said upstream and downstream confining walls, wherein said upstream and downstream confining walls lie in planes which are skewed with respect to said longitudinal axis at an angle of 30 to 60 degrees;
   (b) feedstock injection means for the introduction of at least one reactant through said upstream confining wall into said precombustion chamber;
   (c) means for introducing combustion gases tangentially through said cylindrical wall into said precombustion chamber; and
   (d) a pyrolytic carbon black-forming section operatively connected with said precombustion chamber, and in open communication with said precombustion chamber through said downstream confining wall.

2. A carbon black reactor in accordance with claim 1, wherein said means for introducing said combustion gases tangentially through said cylindrical wall define a main direction of hot combustion gas injection which is essentially parallel to said upstream and downstream confining walls.

3. A carbon black reactor in accordance with claim 2, wherein said means for introducing said combustion gases are arranged for gas injection essentially perpendicular to the longitudinal axis of said cylindrical wall.

4. A carbon black reactor comprising:
   (a) a precombustion chamber defined by an upstream confining wall, a downstream confining wall substantially parallel thereto, and a cylindrical wall having a longitudinal axis wherein said cylindrical wall connects said upstream and downstream confining walls;
   (b) feedstock injection means for the introduction of at least one reactant through said upstream confining wall of said precombustion chamber;
   (c) means for introducing combustion gases tangentially through said cylindrical wall into said precombustion chamber consisting essentially of a first means defining a single first tunnel tangentially entering said precombustion chamber through said cylindrical wall and a second means defining a single second tunnel tangentially entering said precombustion chamber corotationally with said first means through the opposite side of said cylindrical wall, said second tunnel being offset along the longitudinal axis of said cylindrical wall from said first tunnel; and
   (d) a pyrolytic carbon black-forming section operatively connected with said precombustion chamber, and in open communication with said precombustion chamber through said downstream confining wall.

5. A carbon black reactor in accordance with claim 4, wherein said means for introducing said combustion gases tangentially through said cylindrical wall are also parallel to said upstream and downstream confining walls, and further are perpendicular to the longitudinal axis of said cylindrical wall.

6. A carbon black reactor comprising:
   (a) a precombustion chamber defined by an upstream confining wall, a downstream confining wall substantially parallel thereto, and a cylindrical wall which connects said upstream and downstream confining walls, wherein said upstream and downstream confining walls lie in planes which are skewed with respect to the longitudinal axis of said chamber at an angle of 30 to 60 degrees;
   (b) feedstock injection means for the introduction of at least one reactant through said upstream confining wall into said precombustion chamber;
   (c) means for introducing combustion gases tangentially through said cylindrical wall into said precombustion chamber, comprising a first means defining a first tunnel tangentially entering said precombustion chamber through said cylindrical wall and a second means defining a second tunnel tangentially entering said precombustion chamber corotationally through the opposite side of said cylindrical wall, said first tunnel being closer to said upstream confining wall than said second tunnel; and (d) a pyrolytic carbon black-forming section operatively connected with said precombustion chamber, and in open communication with said precombustion chamber through said downstream confining wall.

7. A carbon black reactor in accordance with claim 6, wherein said means for introducing said combustion gases tangentially through said cylindrical wall are also parallel to said upstream and downstream confining walls and wherein said second tunnel is offset along the longitudinal axis of said cylindrical wall from said first tunnel by a distance of at least one diameter of said tunnels.

8. A carbon black reactor in accordance with claim 7, wherein said means for introducing said combustion gases are further perpendicular to the longitudinal axis of said cylindrical wall.

9. A reactor in accordance with one of claims 1 through 8, further comprising
(a) quenching means downstream of said carbon black forming section for quenching the carbon black thus formed; and
(b) conduit means for the recovery of carbon black from said reactor and quenching means.

10. A reactor in accordance with one of claims 1 through 8, wherein said feedstock injection means comprise one or more tubes, parallel to the longitudinal axis of said cylindrical wall, for liquid feedstock reactants, enclosed concentrically by pipes for the introduction of cooling air.

11. A reactor in accordance with claim 10 wherein one or more of said concentric tubes and pipes are radially offset from the longitudinal axis of said cylindrical wall by a distance equal to 25 to 75 percent of the radius of said cylindrical wall.

12. A reactor in accordance with one of claims 1 through 8, wherein said precombustion chamber is larger in diameter than said carbon black forming section, and is of a length approximately equal to from 75 to 200 percent the diameter of said carbon black forming section.

13. A reactor in accordance with one of claims 1 through 8, wherein said means for introducing combustion gases comprise conduit means for gaseous reactants concentrically enclosing tubular conduit means for liquid or gaseous fuels.

14. A reactor in accordance with one of claims 1 through 8, wherein said carbon black forming section comprises a venturi-shaped choke.

15. A reactor with a carbon black forming section in accordance with claim 14, wherein said venturi-shaped choke is rotationally asymmetric.

16. A reactor in accordance with claim 14 wherein the walls of the upstream section of said venturi-shaped choke converge at a total angle of from about 5 to about 30 degrees to a throat about half the diameter of said carbon black forming section, with the walls of the downstream section diverging at a total angle of from about 10 to about 25 degrees.

17. A reactor in accordance with claim 14, wherein the axis of said venturi-shaped choke is offset radially from said longitudinal axis of said cylindrical wall.

18. A carbon black reactor in accordance with claim 1, wherein said means for introducing combustion gases tangentially define a single tunnel.

19. A carbon black reactor in accordance with claim 4, wherein said upstream and said downstream confining walls lie in planes which are skewed with respect to the longitudinal axis of said cylindrical wall.

20. A carbon black reactor in accordance with claim 4, wherein said upstream and said downstream confining walls lie in planes which are essentially perpendicular to the longitudinal axis of said cylindrical wall.

21. A carbon black reactor in accordance with claim 4, wherein said second tunnel is offset along said longitudinal axis of said cylindrical wall from said first tunnel by a distance of at least one diameter of said tunnels.

* * * * *